US006472344B1

(12) United States Patent
Wang et al.

(10) Patent No.: US 6,472,344 B1
(45) Date of Patent: Oct. 29, 2002

(54) CATALYST OF A METAL HETEROPOLY ACID SALT THAT IS INSOLUBLE IN A POLAR SOLVENT ON A NON-METALLIC POROUS SUPPORT AND METHOD OF MAKING

(75) Inventors: Yong Wang, Richland; Charles H. F. Peden, West Richland; Saemin Choi, Richland, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/395,309

(22) Filed: Sep. 13, 1999

Related U.S. Application Data

(63) Continuation-in-part of application No. 09/196,630, filed on Nov. 18, 1998, now abandoned.

(51) Int. Cl.[7] .......................... B01J 27/18; B01J 27/19; B01J 27/188
(52) U.S. Cl. ...................... 502/208; 502/209; 502/210; 502/211
(58) Field of Search ............... 502/208, 209, 502/210, 211

(56) References Cited

U.S. PATENT DOCUMENTS 5,366,945 A 11/1994 Kresge et al. ............... 502/60
5,714,429 A * 2/1998 Haining ..................... 502/232

FOREIGN PATENT DOCUMENTS

WO WO95/13869 5/1995 ..................... 27/19

OTHER PUBLICATIONS

Y Izumi et al., "Silica–Included Heteropoly Compounds as Solid Acid Catalysts", p. 255–262. 1995. No Month Available.
Soled et al., "Preparation of Bulk And Supported Heteropolyacid Salts", p. 441–450. 1997. No Month Available.
Okuhara et al., "Microporous Heteropoly Compound as a Shape Selective Catalyst: $Cs_{2.2}H_{0.8}PW_{12}O_{40}$", p. 155. 1985. No Month Available.
M Misono et al., "Heterogeneous Catalysis by Heteropoly Compounds of Molybdenum and Tungsten", (29) p. 269. 1987. No Month Available.
RJ Rarrauto et al., "Fundamentals of Industrial Catalytic Process", p. 733. 1997. No Month Available.
CJ Hill et al., "Chemical Reviews", (98) p. 1. 1998. No Month Available.
RJ Farrauto et al., "Fundamentals of Industrial Catalytic Process", p. 733. 1997. No Month Available.
Y Wang et al., "Shape–Selective Solid Acid Catalysis Based on Tungstophosphoric Acid Supported on Mesoporous Silica", p. 353–368. 2000. No Month Available.
LR Pizzio et al., "Acid Catalysts Prepared by Impregnation of Tungstophpsphoric Acid Solutions on Different Supports", (167) p. 283. 1998. No Month Available.
IV Kozhevnikov et al., "New Acid Catalyst Comprising Heteropoly Acid on a Mesoporous Molecular Sieve MCM–41", (30) p. 241. 1995. No Month Available.
IV Kozhevnikov et al., "Study of Catalysts Comprising Heteropoly Acid $H_3PW_{12}O_{40}$ Supported on MCM–41 Molecular Sieve and Amorphous Silica", (114) p. 287 1996. No Month Available.
T Blasco et al., "Supported Heteropolyacid (HPW) Catalysts for the Continuous Alkylation of Isobutane with 2–Butene: The Benefit of Using MCM–41 With Larger Pore Diameters", (177) p. 306. 1998. No Month Available.
Y Izumi et al., "Catalysis by Heterogeneous Supported Heteropoly Acid", (84) p. 402. 1983. No Month Available.
JB Moffat et al., "The Oxidation of Methane on Heteropoly–oxometalates", (109) p. 206. 1988. No Month Available.
C Rocchiccioli–Deltcheff et al., "Structure and Catalytic Properties of Silica–Supported Polyoxomolybdates", (126) p. 591. 1990. No Month Available.
JS Beck et al., "A New Family of Mesoporous Molecular Sieves Prepared with Liquid Crystal Templates", (114) p. 10834. 1992. No Month Available.
CT Kresge et al., "Ordered Mesoporous Molecular Synthesized by a Liquid–Crystal Template Mechanism", (359) p. 710. 1992. No Month Available.

* cited by examiner

Primary Examiner—Elizabeth D. Wood
(74) Attorney, Agent, or Firm—Stephen R. May; Douglas E. McKinley, Jr.

(57) ABSTRACT

The present invention includes a catalyst having (a) a non-metallic support having a plurality of pores; (b) a metal heteropoly acid salt that is insoluble in a polar solvent on the non-metallic support; wherein at least a portion of the metal heteropoly acid salt is dispersed within said plurality of pores. The present invention also includes a method of depositing a metal heteropoly acid salt that is insoluble in a polar solvent onto a non-metallic support having a plurality of pores. The method has the steps of: (a) obtaining a first solution containing a first precursor of a metal salt cation; (b) obtaining a second solution containing a second precursor of a heteropoly acid anion in a solvent having a limited dissolution potential for said first precursor; (c) impregnating the non-metallic support with the first precursor forming a first precursor deposit within the plurality of pores, forming a first precursor impregnated support; (d) heating said first precursor impregnated support forming a bonded first precursor impregnated support; (e) impregnating the second precursor that reacts with the precursor deposit and forms the metal heteropoly acid salt.

8 Claims, 7 Drawing Sheets

CATALYST OF A METAL HETEROPOLY ACID SALT THAT IS INSOLUBLE IN A POLAR SOLVENT ON A NON-METALLIC POROUS SUPPORT AND METHOD OF MAKING

CROSS REFERENCE TO RELATED APPLICATION

This application is a continuation in part of U.S. Ser. No. 09/196,630, filed Nov. 18, 1998, now abandoned.

This invention was made with Government support under Contract DE-AC0676RLO1830 awarded by the U.S. Department of Energy. The Government has certain rights in the invention.

FIELD OF THE INVENTION

The present invention is a catalyst of a metal heteropoly acid salt that is insoluble in a polar solvent on a non-metallic porous support and method of making.

As used herein, 'dispersed' or 'dispersion' refers to the degree in which the catalyst is uniformly coated on a support surface as defined in *Fundamentals of Industrial Catalytic Processes*, R. J. Farrauto and C. H. Bartholomew, Blackie Academic & Professional Press (New York, N.Y.) 1997, p. 733. Specifically, dispersion (D) is defined there as "the fraction of atoms of a phase exposed to the surface. $D=N_S/N_T$, where $N_S$ is the number of surface atoms and $N_T$ the total number of atoms of a given kind. Dispersion increases with decreasing crystallite diameter approaching unity at a diameter of 1 nm." Thus, a catalyst material is said to be dispersed or highly dispersed if substantially all of the catalyst material uniformly coats the surface of a non-metallic support material. Conversely, low dispersion or non-dispersed indicates that a majority fraction of the catalyst material is present in the form of large clusters and/or as a distinctly separate phase from the non-metallic support material.

BACKGROUND OF THE INVENTION

Homogeneous acid catalysts such as sulfuric acid and aluminum chloride are currently used to catalyze many industrially important reactions. Although these homogeneous acid catalysts are catalytically efficient, they are not environmentally benign and create disposal problems.

Demands for a cleaner environment are motivating the chemical and petrochemical industries to develop alternative catalyst systems and/or processes to meet more stringent regulations. One particular area that has attracted considerable attention recently involves the replacement of HF and $H_2SO_4$ liquid acids in commercial alkylation units by more environmentally benign heterogeneous solid acids. Although current homogeneous catalysts are efficient, their corrosive and toxic nature provides potential environmental hazards and presents operational problems, including difficulty in separation, recovery and reutilization, that results in higher capital costs. Among many solid acid systems, heteropoly acids (HPA) (also known as polyoxometalates, POMs for short) [C. L. Hill, guest editor, Chemical Reviews 98 (1998) 1–387) with Keggin anion structures have received considerable attention due to their simple preparation and strong acidity. Specifically, 12-tungstophosphoric acid ($H_3PW_{12}O_{40}$), denoted as TPA hereafter, is among the most extensively studied since it possesses the highest Brönsted acidity, stronger than that of 100% sulfuric acid, which results from minimized charge on the anion surface. However, to date, low efficiency due to low surface area, rapid deactivation and relatively poor thermal stability are some of the major problems associated with these TPAs in conventional bulk acid forms.

Attempts to improve the efficiency of these materials have been made by supporting tungstophosphoric acid (TPA) on various high surface area supports (G. I. Kapustin, T. R. Brueva, A. L. Klyachko, M. N. Timofeeva, S. M. Kulikov and I. V. Kozhevnikov, Kinet. Katal., 31 (1990), 1017: L. R. Pizzio, C. V. Caceres and M. N. Blanco, Appl. Catal. A: General, 167 (1998) 283) and, more recently, on mesoporous silica with ordered pore structures (I. V. Kozhevnikov, A. Sinnema, R. J. J. Jansen, K. Pamin and H. van Bekkum, Catal. Lett., 30 (1995) 241: I. V. Kozhevnikov, K. R. Kloetstra, A. Sinnema, H. W. Zandbergen and H. van Bekkum, J. Mol. Catal. A: Chemical, 114 (1996) 287: T. Blasco, A. Corma, A. Martinez and P. Martinez-Escolano, J. Catal., 177 (1998) 306: C. T. Kresge, D. S. Marler, G. S. Rav and R. H. Rose, U.S. Pat. No. 5,366,945, 1994). Kapustin, et al. reported that acidity of the supported TPA decreased in the following order: $SiO_2 > \alpha\text{-}Al_2O_3 > $carbon. They concluded that the strong interaction between TPA and carbon might have resulted in the decomposition of the Keggin structure. Thus, silica is a suitable support material: likely due to its intrinsic inertness (Y. Izumi, R. Hasebe and K. Urabe, J. Catal., 84 (1983) 402; J. B. Moffat and S. Kasztelan, J. Catal., 109 (1988) 206; C. Rocchiccioli-Deltcheff, M. Amirouche, G. Herve, M. Fournier, M. Che and J. M. Tatibouet, J. Catal., 126 (1990) 591.).

Recently, mesoporous silica known as MCM-41, first developed by researchers at Mobil (J. S. Beck, J. C. Vartuli, W. J. Roth, M. E. Leonowicz and C. T. Kresge, J. Am. Chem. Soc., 114 (1992) 10834; C. T. Kresge, M. E. Leonowicz, W. J. Roth, J. C. Vartuli and J. S. Beck, Nature, 359 (1992) 710.), has been used to support TPA clusters to take advantage of its uniform pore size and highly ordered structures. More recently, we have reported that acid neutralization of the mesoporous silica support assisted in preserving the Keggin structure even at TPA loadings as low as 10 wt % (Y. Wang, A. Y. Kim, X. S. Li, L. Wang, C. H. F. Peden and B. C. Bunker, ACS Book on Shape-Selective Catalysis, in press (1999).). Although, we have observed an enhancement in resistance to leaching of TPA by water when mesoporous silica was used as the support instead of amorphous silica, this was likely due to steric constraints rather than a direct improvement in the grafting of the TPA clusters on the surface.

Another approach to improve efficiency of HPA catalysts is by exchanging the acidic protons with large cations such as Cs. One particular Cs heteropoly acid salt, Cs tungstophosphoric acid ($Cs_{2.5}H_{0.5}PW_{12}O_{40}$), shows extremely high aromatic alkylation activity with non-polar reactants due to much enhanced surface area at this stoichiometry. Unfortunately, all bulk Cs heteropoly acid salts are micron-sized particles and can not be practically used in a fixed-bed type or a slurry type reactor because of pressure drop or filtration problems. Furthermore, the insolubility of the Cs heteropoly acid salts makes conventional catalyst preparation via aqueous impregnation impossible.

Soled et al (S. Soled, S. Miseo, G. McVicker, W. E. Gates, A. Gutierrez, and J. Paes, Catalysis Today, 36 (1997) 441–450) attempted to disperse Cs tungstophosphoricacid salts on silica supports in an effort to provide an environmentally friendly, kinetically efficient catalyst. Their method involves two-step impregnation via incipient wetness method i.e., impregnating catalyst supports with an aqueous $Cs_2CO_3$ solution followed by the impregnation/precipitation of an aqueous heteropoly acid solution. Their activity and sample characterization results showed that Cs heteropoly acid salts were non-dispersed with no measurable dispersion due to the high mobility of Cs cations during the second-step impregnation with the aqueous heteropoly acid solution. Consequently, the supported Cs heteropoly acid salts were not efficient in catalyzing aromatic alkylation reactions.

Thus, there remains a need for a catalyst that is environmentally friendly and catalytically efficient. More specifically, there is a need to develop a practical way for preparing engineered metal heteropoly acid salt catalysts.

SUMMARY OF THE INVENTION

The present invention includes a catalyst having
(a) a non-metallic support having a plurality of pores;
(b) a metal heteropoly acid salt that is insoluble in a polar solvent on the non-metallic support; wherein at least a portion of the metal heteropoly acid salt is dispersed within said plurality of pores.

The present invention also includes a method of depositing a metal heteropoly acid salt that is insoluble in a polar solvent onto a non-metallic support having a plurality of pores. The method has the steps of:
(a) obtaining a first solution containing a first precursor of a metal salt cation;
(b) obtaining a second solution containing a second precursor of a heteropoly acid anion in a solvent having a limited dissolution potential for said first precursor;
(c) impregnating the non-metallic support with the first precursor forming a first precursor deposit within the plurality of pores, forming a first precursor impregnated support;
(d) heating said first precursor impregnated support forming a bonded first precursor impregnated support;
(e) impregnating the second precursor that reacts with the precursor deposit and forms the metal heteropoly acid salt.

An advantage of the present invention is that metal heteropoly acid salts are grafted on non-metallic porous supports. It is a further advantage that both the activity data and characterization results confirm that the metal heteropoly acid salts are highly dispersed on non-metallic supports. An additional advantage specific for Cs heteropoly acid salts is that the unique characteristics of bulk Cs tungstophosphoric acid ($Cs_{2.5}H_{0.5}PW_{12}O_{40}$), including high specific surface area and enhanced thermal stability, can be achieved at lower Cs stoichiometry, thus sacrificing fewer acidic protons. In addition, the porosity of non-metallic supports (for example, mesoporous silica) can be tailored to add shape selectivity to the catalytic reactions of interest.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
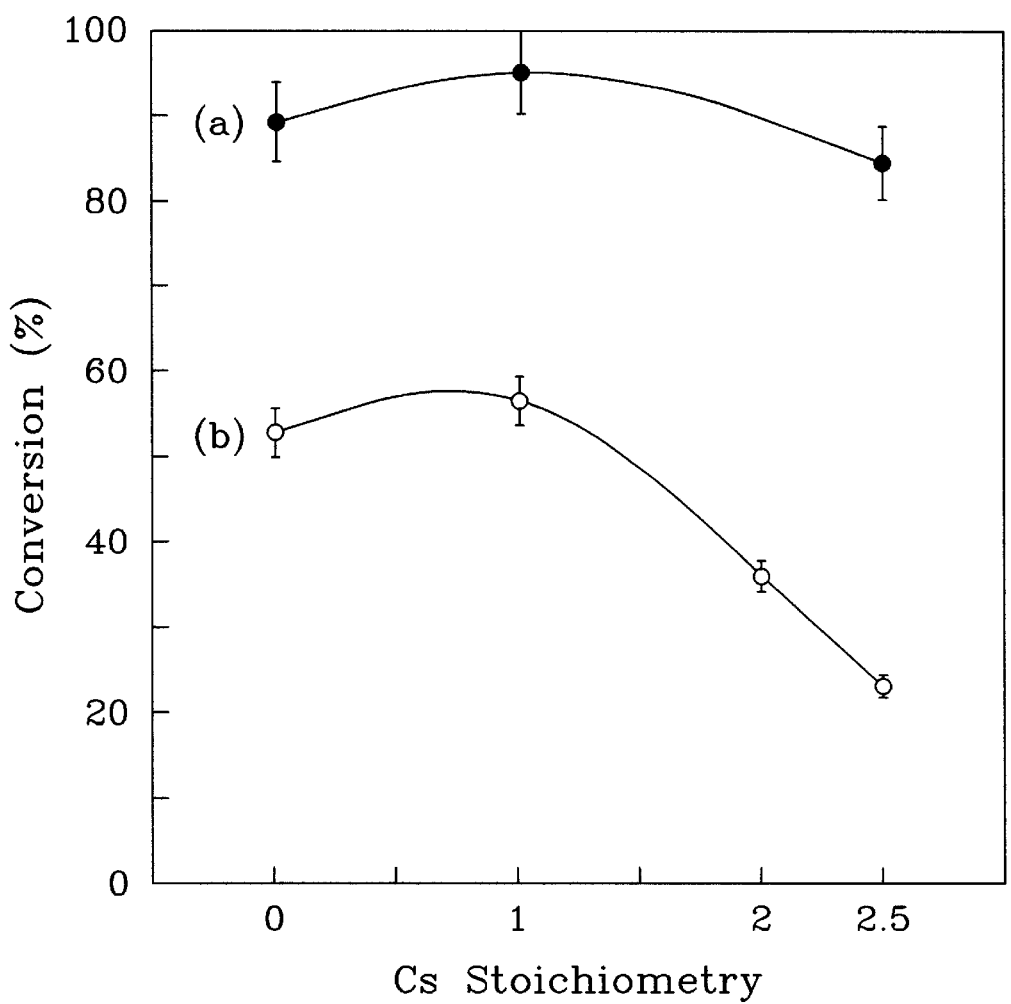
FIG. 1 shows the conversion for the alkylation of 1,3,5-trimethylbenzene by cyclohexene at 80° C. comparing prior art materials (b) and materials according to the present invention (a).

The present invention includes a catalyst having
(a) a non-metallic support having a plurality of pores;
(b) a metal heteropoly acid salt that is insoluble in a polar solvent on the non-metallic support; wherein at least a portion of the metal heteropoly acid salt is dispersed within said plurality of pores.

The non-metallic support is any non-metallic support that is inert to the Keggin structure of heteropoly acids. Non-metallic support includes but is not limited to silica, silicates, carbon, zirconia, titania and combinations thereof.

Heteropoly acid of the metal/heteropoly acid salt that is insoluble in a polar solvent includes but is not limited to 12-tungstophosphoric acid, $H_3PW_{12}O_{40}$, 12-molybdophosphoricacid, $H_7[P(Mo_2O_7)_6]$, and combinations thereof. The metal of the metal heteropoly acid salt must have an ionic radius greater than the ionic radius of sodium and have a valence of +1. Preferred metals include but are not limited to Group 1A metals including Fr, Cs, Rb, K and combinations thereof as well as Ag.

In a preferred embodiment, the catalyst is a $Cs_xH_{3-x}PW_{12}O_{40}$ salt dispersed on mesoporous silica materials similar to and including the Mobil-invented material, MCM-41.

Polar solvent includes but is not limited to water.

The phrase "at least a portion" means a measurable amount of dispersion. Preferably, the portion is at least 20%, more preferably at least 50%, yet more preferably at least 75%, further preferably at least 95% up to and including 100%.

The present invention also includes a method of depositing a metal heteropoly acid salt that is insoluble in a polar solvent onto a non-metallic support having a plurality of pores. The method has the steps of:

(a) obtaining a first solution containing a first precursor of a metal salt cation;
(b) obtaining a second solution containing a second precursor of a heteropoly acid anion in a solvent having a limited potential for dissolution of the first precursor;
(c) impregnating the non-metallic support with the first precursor forming a first precursor deposit within the plurality of pores, forming a first precursor impregnated support;
(d) heating said first precursor impregnated support forming a bonded first precursor impregnated support;
(e) impregnating the bonded first precursor impregnated support with the second precursor that reacts with the first precursor deposit and forms the metal heteropoly acid salt a portion of which is dispersed upon the non-metallic support.

Limited dissolution potential means a potential for dissolution of less than 25% of the salt cation precursor from the bonded first precursor impregnated support at room temperature.

The first solution has a solvent including but not limited to water methanol, acetone, and combinations thereof. The first solution has a solute or first precursor of a metal salt cation including but not limited to metal carbonates, metal nitrates, metal chlorides and combinations thereof. In a preferred embodiment, the solute is $Cs_2CO_3$ and the solvent is water.

The second solution includes but is not limited to an organic solvent including but not limited to ethanol, propanol, butanol, and combinations thereof. According to a preferred embodiment, 1-butanol is the organic solvent. The second solution has a solute or second precursor of heteropoly acid anion including but not limited to 12-tungstophosphoric acid, 12-molybdophosphoric acid, and combinations thereof. A preferred second precursor is $H_3PW_{12}O_{40}$ and the solvent is 1-butanol.

Example 1
Catalyst Preparation

MCM-41 type mesoporous silica with monodimensional pores of 50 Å was synthesized using a protocol similar to that reported by others (J. S. Beck, J. C. Vartuli, W. J. Roth, M. E. Leonowicz and C. T. Kresge, J. Am. Chem. Soc., 114 (1992)10834; C. T. Kresge, M. E. Leonowicz, W. J. Roth, J. C. Vartuli and J. S. Beck, Nature, 359 (1992) 71.0). The synthesized mesoporous silica was then used as the catalyst support having characteristics of uniform pore size distribution, high surface area, ordered structure, and large pore volume. Prior to impregnation, the mesoporous silica was first treated with a 0.1M $HNO_3$ solution (10 ml of solution per g of silica) and stirred for 15 min at 80° C. before drying in vacuum at 110° C. overnight and calcined at 540° C. for 1 hour.

A first sample of a catalyst of highly dispersed Cs-TPA on mesoporous silica according to the present invention, denoted as $Cs_x$-TPA/MS (x=Cs stoichiometry, MS=mesoporous silica) hereafter, was prepared as follows. Aqueous $Cs_2CO_3$ (Aldrich, 99.9%) solutions (0.03–1.0M) and TPA solutions (0.03–1.0M) using the Keggin type $H_3PW_{12}O_{40}$ (Aldrich) dissolved in an organic solvent (for example, butanol) were initially prepared. The organic solvent for the TPA solutions was chosen to be one in which the heteropoly acid is soluble while $Cs_2CO_3$ is less soluble or insoluble. Thus according to the present invention, two steps were utilized to mitigate Cs mobility during catalyst preparation in order to yield the desirable high dispersion of the Cs-TPA salt on mesoporous silica. First, $Cs_2CO_3$ was impregnated by aqueous incipient wetness onto mesoporous silica, dried at 110° C. overnight and calcined at temperature ranges between 300° C. to 700° C. for 2 hours. It is believed that the calcination step facilitates the anchoring of Cs to the silica surface likely via a reaction between surface silanols and $Cs_2CO_3$. Following this, TPA was impregnated using a similar incipient wetness technique with various organic solvents including ethanol, 1-propanol and 1-butanol. We believe that utilization of an organic solvent rather than water for this impregnation mitigates Cs migration because it likely avoids hydrolysis of Si—O—Cs and subsequent dissolution of CsOH. These samples were then dried at 110° C. overnight and calcined at 300° C. for 2 hours.

A second sample of a catalyst known in the prior art was made as follows. Mesoporous silica supported Cs-TPA samples were prepared using the two-step impregnation method reported by Soled et al. (hereafter referred to as Cs/TPA/MS(conventional) for simplicity). In these authors' first step, $Cs_2CO_3$ (Aldrich, 99.9%) was impregnated by aqueous incipient wetness onto mesoporous silica, dried at 110° C. overnight and calcined at 300° C. for 2 hours. Following this, TPA was impregnated using a similar aqueous incipient wetness technique, dried at 110° C. overnight and calcined at 300° C. for 2 hours. Supported TPA (without Cs substitution) catalysts were prepared by incipient wetness impregnation directly (i.e., without prior $Cs_2CO_3$ impregnation and calcination) onto mesoporous silica using solutions of TPA in ethanol, 1-propanol, 1-butanol, and water, dried at 110° C. overnight and calcined at 300° C. for 2 hours. Bulk Cs-TPA materials were prepared by adding the $Cs_2CO_3$ solution dropwise to the TPA solution while stirring. The resulting precipitate was dried at 110° C. overnight in vacuum and calcined at 300° C. for 2 hours.

Reactivity of Supported Cs-TPA Catalysts

Catalyst activities were tested using the liquid phase alkylation of 1,3,5-trimethylbenzene (mesitylene, Aldrich, 98%) with cyclohexene (Aldrich, 99%), as reported in the literature [S. Soled, S. Miseo, G. McVicker, W. E. Gates, A. Gutierrez and J. Paes, Catal. Today, 36 (1997) 441; T. Okuhara, T. Nishimura and M. Misono, Chem. Left., (1995) 155]. Approximately 50 mg of bulk or supported catalyst was loaded into a 7 mm OD vial and calcined at 300° C. under $N_2$ for 2 hours. Under an inert environment (Argon), 2 g of premixed 5 wt % cyclohexene in 1,3,5-trimethylbenzene solution was added and then reacted in an 80° C. water bath while being vigorously stirred. After a certain period of time, the reaction vial was withdrawn to an ice bath for cooling and centrifuged for further sampling. The products were separated using a gas chromatograph equipped with a flame ionization detector.

Catalytic properties of selected catalysts and their bulk counterpart are summarized in Table E1-1. As shown in the table, the novel 50 wt % $Cs_{2.5}$-TPA/MS material that is the subject of this invention was about five times as active as that made from the method of Soled, et al. and was also more active than the bulk $Cs_{2.5}$-TPA.

TABLE E1-1

Catalytic Properties of Cs Substituted Tungstophosphoric Acid Catalysts

| Catalyst[‡] Code | Activity[†] (mmol/g$_{TPA}$/hr) |
|---|---|
| 50% Cs$_{2.5}$-TPA/MS(Conventional) | 13.2 |
| 50% Cs$_{2.5}$-TPA/MS | 64.8 |
| Bulk Cs$_{2.5}$-TPA | 39.8 |

[‡]Catalyst code represents TPA loading, Cs stoichiometry, and support material (conventional: previously published preparation method (S. Soled, S. Miseo, G. McVicker, W. E. Gates, A. Gutierrez and J. Paes, Catal. Today, 36 (1997) 441).
[†]Alkylation of 1,3,5-trimethylbenzene by cyclohexene (5 wt %) measured after 15 min at 80° C.

The primary purpose for adopting the Cs=2.5 for bulk materials is that this specific stoichiometry provided high surface area and mesoporous porosity giving rise to optimized activity. Considering the fact that a high surface area carrier with ordered structure. is adopted here to support the TPA clusters and that more Cs substitution leads to a reduction of acidic protons, supported Cs-TPA catalysts with a lower Cs stoichiometry were prepared and examined. In this way, Cs substitution levels that are optimized for catalytic activity and stability to solvent leaching can be determined.

FIG. 1 compares the activity of 50 wt % Cs-tungstophosphoric acid salts supported on mesoporous silica prepared by both the conventional (aqueous TPA impregnation) and the present invention (impregnation using a TPA/BuOH solution) methods as a function of Cs stoichiometry (a complete proton exchange of tungstophosphoric acid with Cs is 3). Over the entire Cs stoichiometry range, supported Cs-tungstophosphoric acid catalysts synthesized with the method of the present invention were superior than that prepared with the conventional method with more prominent performance at higher Cs stoichiometry range. Even the supported TPA materials (i.e., Cs stoichiometry=0) were more active and therefore better dispersed than those prepared using the "conventional" method. Furthermore, at this TPA loading level, supported Cs$_1$-TPA catalysts were more active than their supported parent acids despite lower quantities of active, acidic protons. The results shown in FIG. 1 indicate an optimum Cs stoichiometry, Cs$_x$=1, for mesoporous silica supported Cs/TPA catalysts. Activities are reduced at higher Cs levels believed due to a further reduction of the number of acidic protons in the catalysts. It is important to note that the catalytic activity measurements illustrated in FIG. 1 may underestimate the enhanced activity of the novel, improved catalysts prepared as described in this invention relative to those prepared by the "conventional" method. This is because conversions for the most active materials were near 100% under the conditions tested here.

Figure 2:
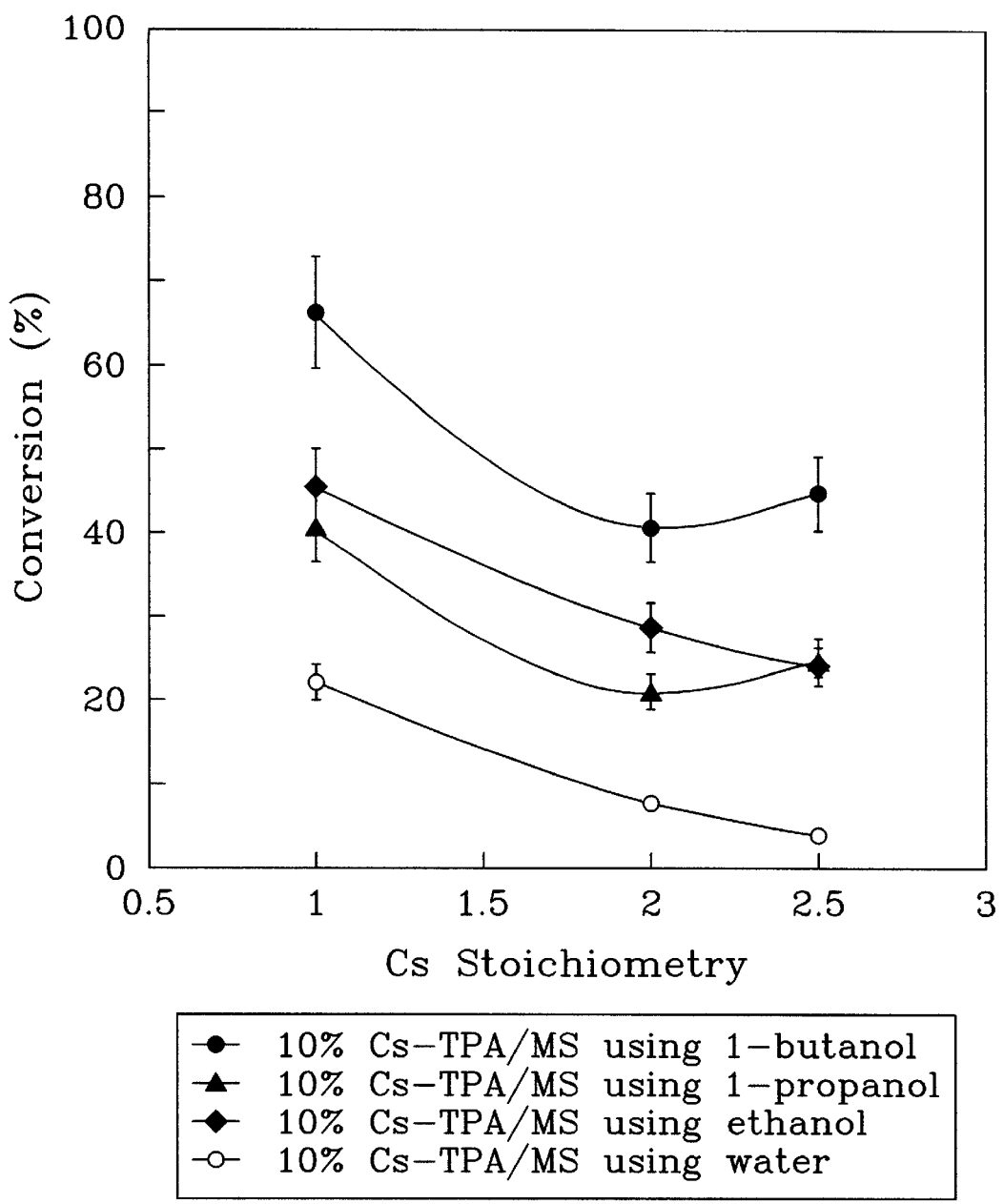
FIG. 2 shows the conversion for the alkylation of 1,3,5-trimethylbenzene by cyclohexene at 80° C. for 10 wt % Cs-TPA/MS prepared using various solvents as a function of Cs stoichiometry. The reaction was run for 2 hours.

The purpose of using a less polar solvent during TPA impregnation was to mitigate Cs mobility during TPA impregnation. A set of 10 wt % Cs-TPA supported on 50 Å MS catalysts was prepared with various organic solvents and also with water for comparison. The effect of solvent type on the alkylation activity of 1,3,5-trimethylbenzene with cyclohexene of these catalysts is illustrated in FIG. 2 as a function of Cs stoichiometry. The FIG. 2 demonstrates again that catalysts prepared with organic solvents showed significantly improved performance than those prepared using water. Additionally, we determined that the activity decreased in the :following order: 1-butanol>1-propanol>ethanol>water. Similar trends have been observed for catalysts with TPA loadings as high as 50 wt % on mesoporous silica. The differences observed for the alcohol solvents can perhaps be understood in the following way. The alcohols, although organic in nature, exhibit polarity that decreases with chain length. For example, the dielectric constants for ethanol, 1-propanol and 1-butanol are 24.3, 20.1 and 17.1, respectively. However, these values are much lower than that of water (78.6) at 25° C. Using solvents of lower dielectric constant may provide a higher probability for TPA anions to diffuse further into the pores with lessened restriction due to reduced electrostatic interactions with the silica support.

Figure 3:
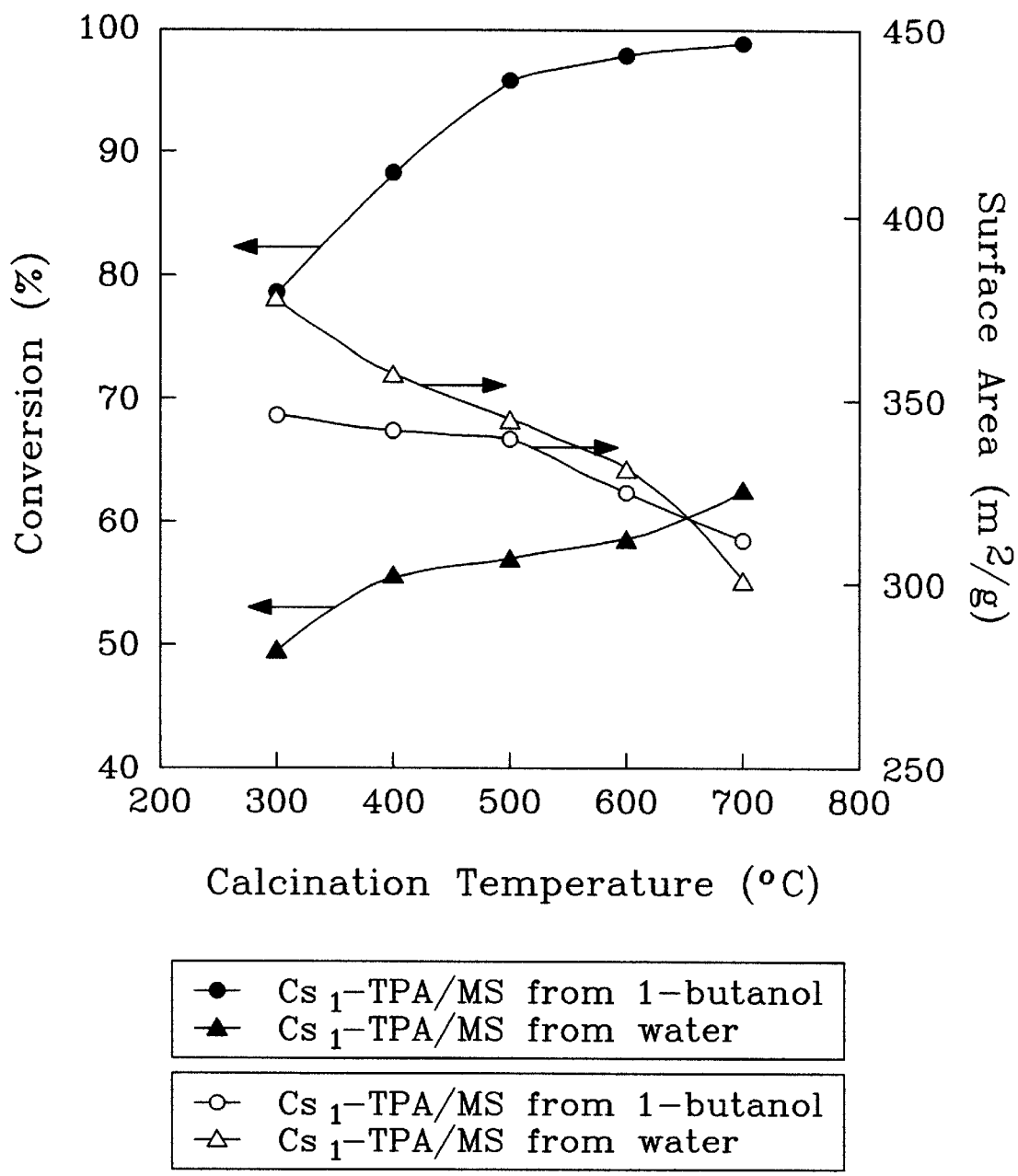
FIG. 3 shows the effect of calcination temperature on the BET surface area and the alkylation of 1,3,5-trimethylbenzene by cyclohexene at 80° C. comparing materials according to the present invention (50 wt % $Cs_1$-TPA/MS using 1-butanol as solvent) and prior art materials (50 wt % $Cs_1$-TPA/MS using water as solvent). The reaction was run for 2 hours.

This novel grafting technique of the present invention also involves treating Cs$_2$CO$_3$ impregnated MS samples at higher temperatures (300–700° C.) before the second step TPA impregnation. This approach was adopted to help anchor the Cs cations by promoting interactions between silanols and Cs$_2$CO$_3$. The effect of pre-calcination temperature on the catalytic properties and BET surface area for 50 wt % Cs$_1$-TPA/MS prepared using 1-butanol and water are shown in FIG. 3. In both cases, catalytic activities increased with pre-calcination temperature probably due to improved anchoring of the Cs species on mesoporous silica. Apparently, catalysts prepared using 1-butanol were almost twice as active as those prepared using water at conversions close to 100%. However, at lower conversions, the supported catalysts prepared using 1-butanol were approximately 5 times more active than those prepared using water (not shown).

Characterization of Supported Cs-TPA Catalysts

Figure 4:
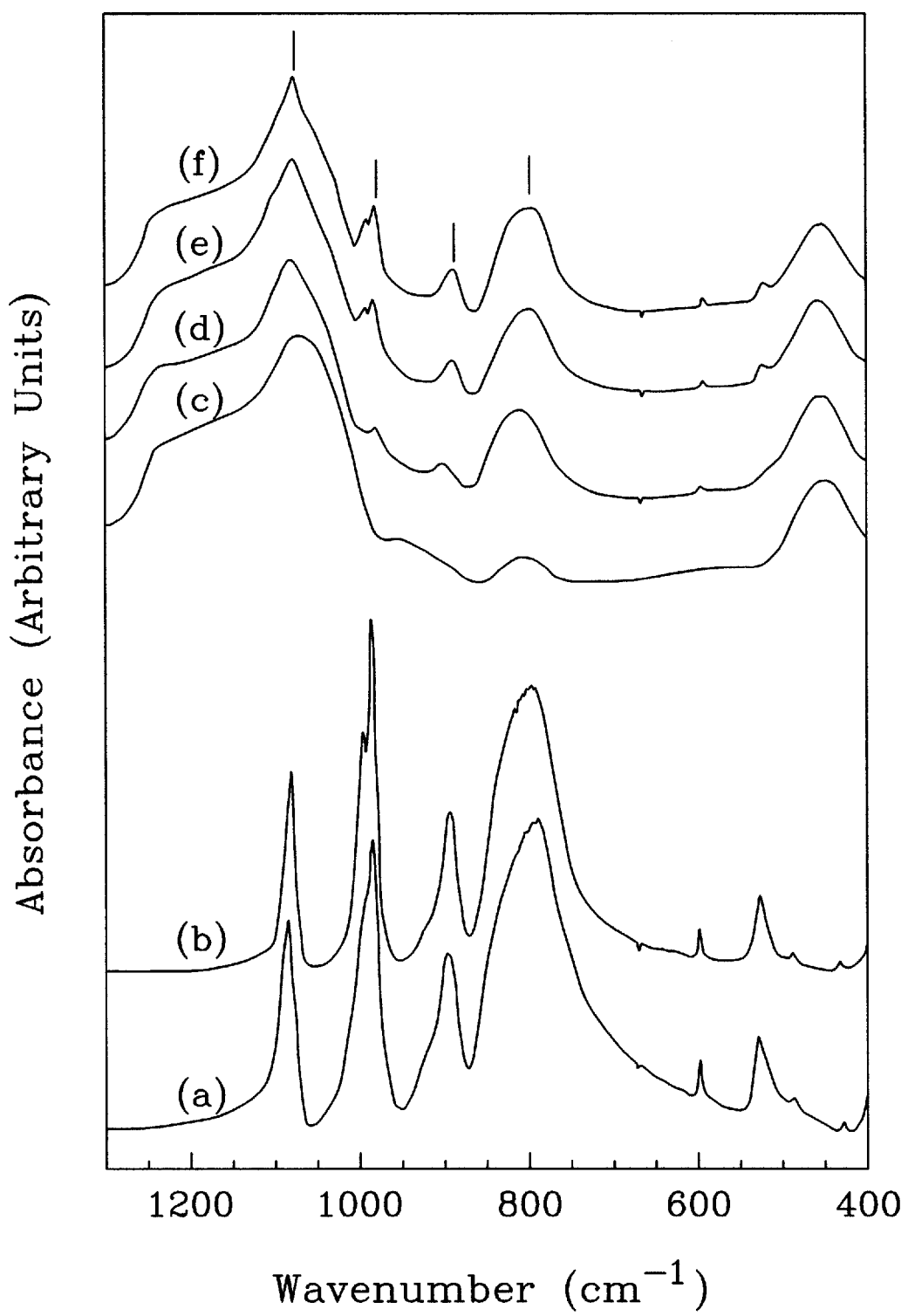
FIG. 4 shows the infrared spectra of (a) bulk tungstophosphoric acid (TPA), (b) bulk $Cs_{2.5}H_{0.5}PW_{12}O_{40}$ ($Cs_{2.5}$-TPA), (c) 50 Å mesoporous silica, (d) TPA supported on mesoporous silica (MS) by prior art methods (50 wt % TPA/MS prepared using water as solvent), (e) $Cs_{2.5}$-TPA supported on MS by prior art methods (50 wt % $CS_{2.5}$-TPA/MS), and (f) $Cs_{2.5}$-TPA supported on MS by methods according to the present invention (50 wt % $Cs_{2.5}$-TPA/MS).

Primary structures of Cs-TPA in the supported catalysts were identified by comparing their FT-IR absorbance bands to those of bulk tungstophosphoric acid (TPA), tungstophosphoric acid salt (Cs-TPA), and mesoporous silica (FIG. 4). Bulk tungstophosphoric acid (H$_3$PW$_{12}$O$_{40}$) and tungstophosphoric salt (CS$_{2.5}$H$_{0.5}$PW$_{12}$O$_{40}$) show the characteristic IR bands at ca 1080 (P—O in the central tetrahedra), 984 (terrhinal W=O), 897 and 812 (W—O—W) cm$^{-1}$ associated with the asymmetric vibrations in the Keggin polyanion (FIG. 4, lines (a),(b)); however, the Cs-TPA catalysts are distinctively characterized by a split in the W=O band. This doublet becomes more prominent as the Cs stoichiometry in the catalyst increases (not shown here), attributed (T. Okuhara, T. Hashimoto, T. Hibi and M. Misono, J. Catal. 93 (1985) 224.) to a direct interaction between the polyanion and Cs$^+$. The same infrared spectroscopic distinguishable features were observed for the 50 wt % TPA/MS (FIG. 4 line (d)) and Cs-TPA/MS catalysts (FIG. 4, lines (e,f)), indicating that the primary Keggin structure is preserved after supporting it onto mesoporous silica. Thus, the new materials according to the present invention had intact polyanion structures and/or species on the silica surface. Similar results (not shown) were obtained even for the supported- materials with lower HPA loadings (10 wt %) and different Cs stoichiometry (Cs$_x$H$_{3-x}$PW$_{12}$O$_{40}$, x=1,2). Furthermore, $^-$P NMR results (not shown) have confirmed that [PW$_{12}$O$_{40}$]$^{3-}$ were the only species present on the support as evidenced by a single $^{31}$P NMR peak at a chemical shift of ca −15 ppm referenced to a 0 ppm response from 85% $H_3PO_4$. This was the case for both the novel 50 wt % Cs-TPA materials as well as those prepared using the method of Soled et al. (S. Soled, S. Miseo, G. McVicker, W. E. Gates, A. Gutierrez, and J. Paes, Catalysis Today, 36 (1997) 441–450).

Figure 5A:
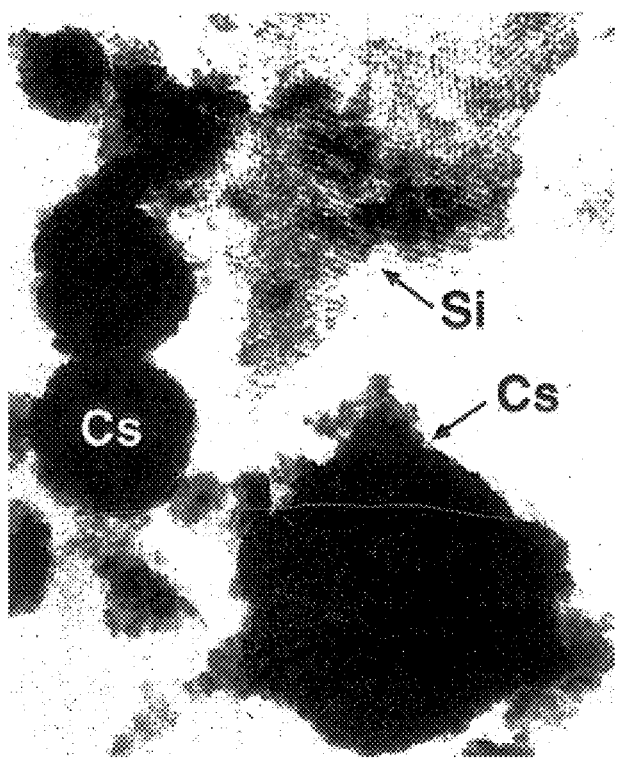
FIG. 5 shows the transmission electron micrographs of prior art materials (a) and materials according to the present invention (b).
Figure 5B:
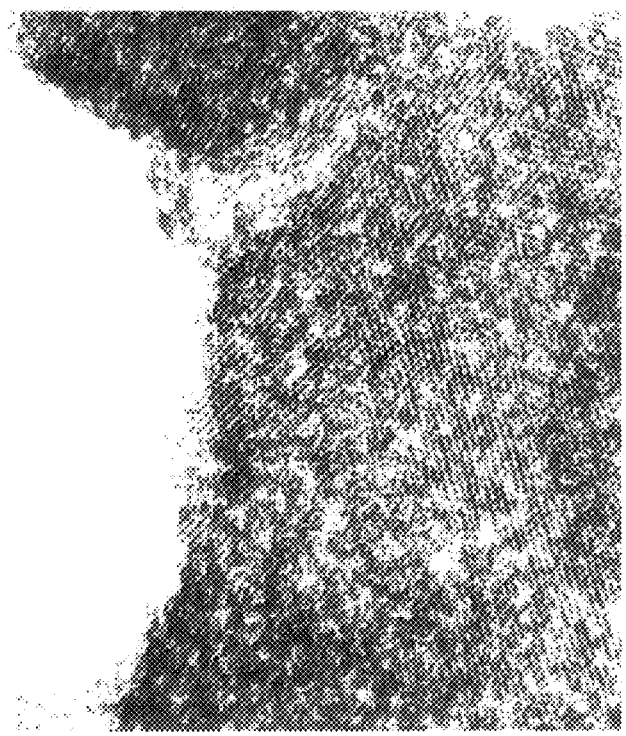

The improved dspersion of Cs-TPA on mesoporous silica based on the preparation methods of the present invention is shown in the comparative TEM results illustrated in FIG. 5a, 5b, and from EDS analysis (not shown). The material we prepared using: the method of Soled et al. resulted in poor dispersion, specifically a segregated phase where Cs-TPA is not uniformly dipersed (FIG. 5(a)) which resulted in poor activity, whereas the novel material(s) consist(s) of uniformly dispersed Cs-TPA salt on mesoporous silica (FIG. 5(b)). As aforementioned, direct impregnation using a Cs-TPA solution was not possible because Cs-TPA is not sufficiently soluble in any solvent.

The variations in alkylation activities with different catalyst synthesis methods, described above, seemed to be, in part, associated with the textural properties of the catalysts. For example, 50 wt % $Cs_1$-TPA/MS prepared in 1-butanol and water have similar surface areas (FIG. 3); however their activities vary by at least a factor of two. $N_2$ adsorption/desorption is used to estimate the surface area whereas the reactants used to evaluate the activity such as cyclohexene and trimethylbenzene are significantly larger than a $N_2$ molecule. Thus, larger molecules such as benzene have been utilized to assess the sorption properties for various mesoporous molecular sieve system with different pore sizes and structures. Accordingly, we have conducted a few preliminary equilibrium adsorption experiments using benzene for the supported $Cs_{2.5}$-TPA materials prepared under identical conditions except for their solvent type, 1-butanol and water. These materials were chosen because they showed the largest difference in activity (FIG. 2). Although not shown here, the total volume of benzene adsorbed at 25° C. for the sample prepared in 1-butanol was almost twice that of the sample prepared in water. This might be due to partial clogging near the pore opening when water is used. Poor diffusivity of the TPA anions and/or clogging induced by mobile Cs species could lead to this type of bottle-neck pore structures that can not be easily distinguished using $N_2$.

Catalyst Stability

Figure 6:
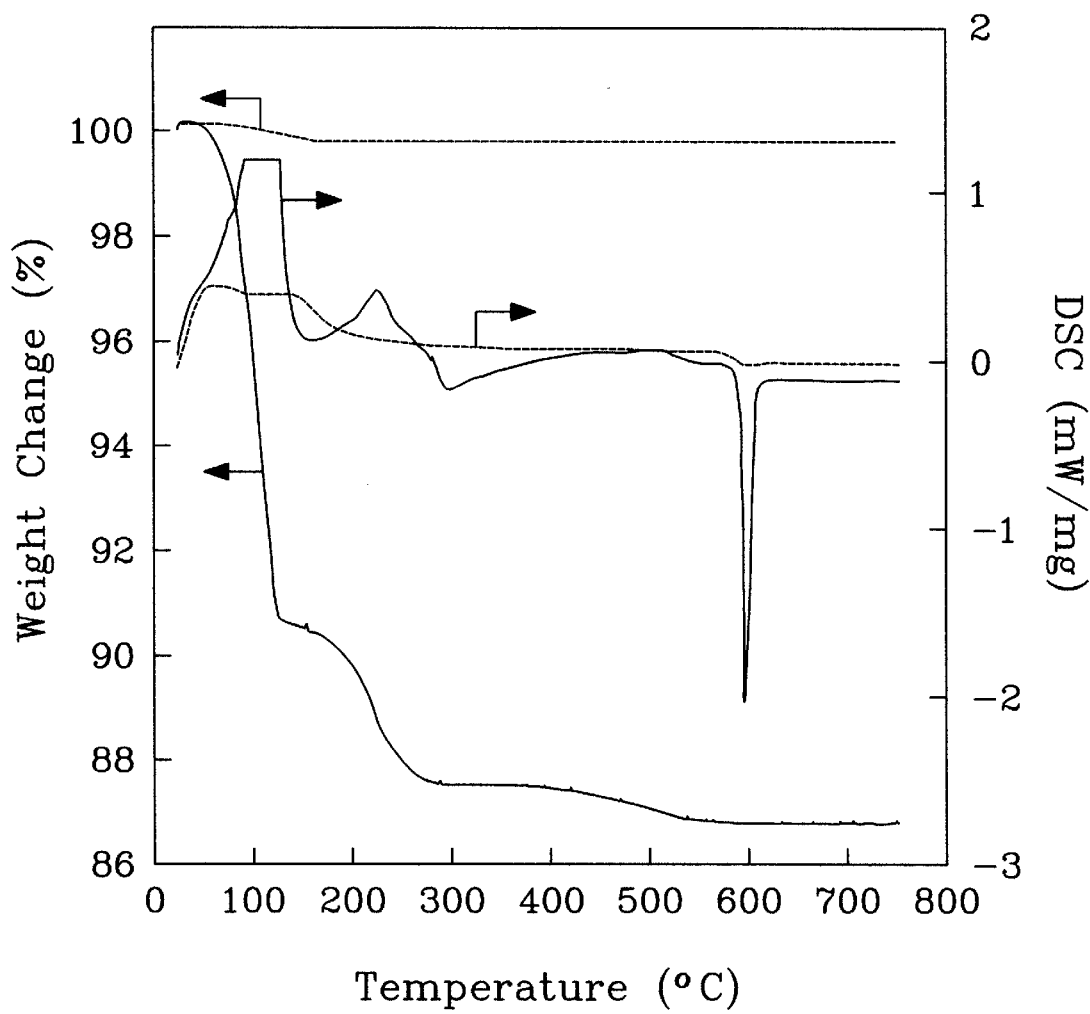
FIG. 6 shows the weight change (from thermogravimetric analysis) and the energy change (from differential scanning calorimetry) of bulk tungstophosphoric acid (TPA; solid lines) and bulk $CS_{2.5}H_{0.5}PW_{12}O_{40}$ ($Cs_{2.5}$-TPA, dashed lines).
Figure 7:
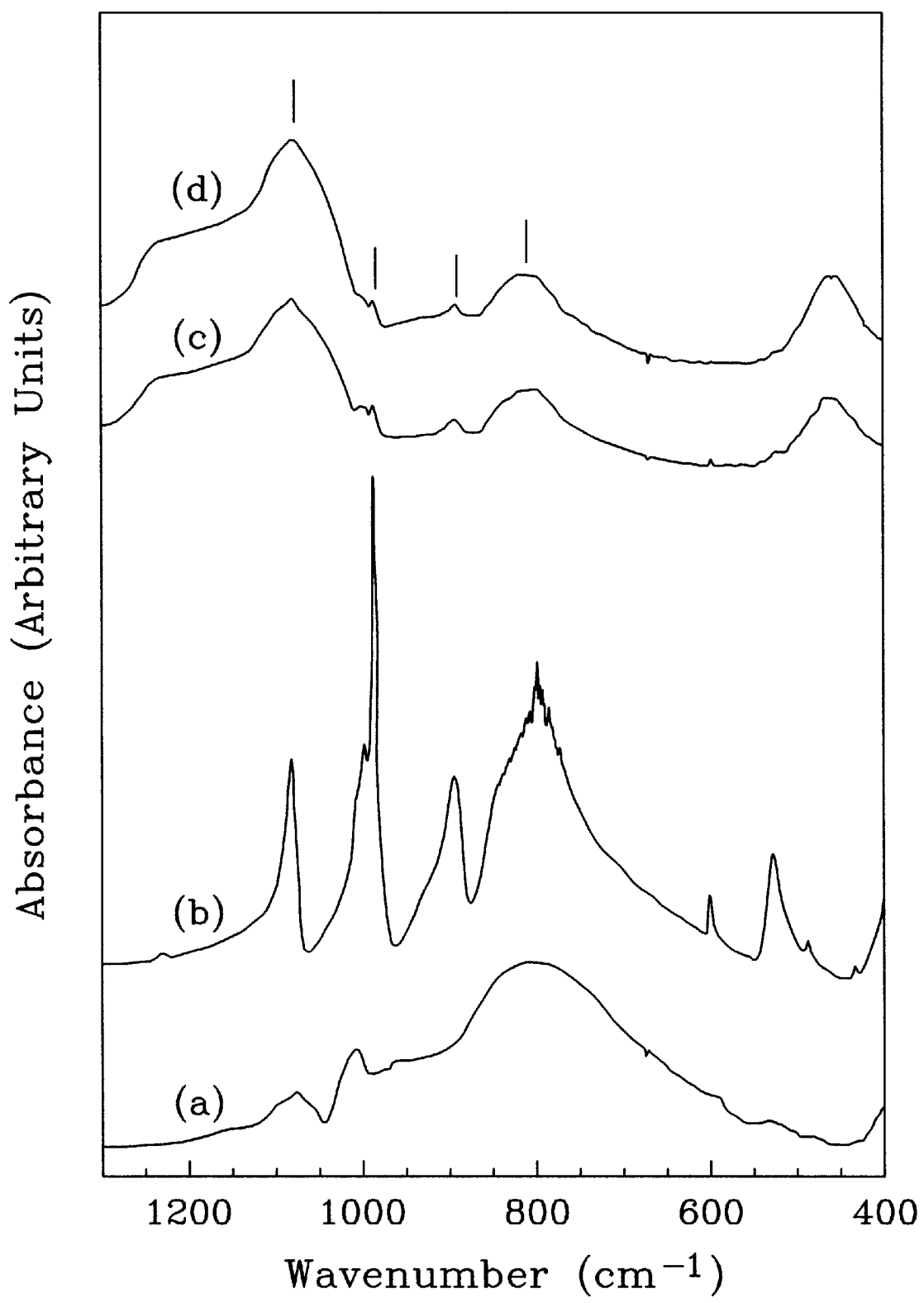
FIG. 7 shows the infrared spectra of (a) bulk tungstophosphoric acid (TPA), (b) bulk $Cs_{2.5}H_{0.5}PW_{12}O_{40}$ ($Cs_{2.5}$-TPA), (c) materials according to the present invention (50 wt % $Cs_{2.5}$-TPA/MS) and (d) materials according to the present invention after heating at 600° C. for 10 min.

An important potential benefit of supporting TPA on oxide supports (including MS) is enhanced stability for the TPA salts. To assess this, leaching and thermal stability experiments on supported Cs tungstophosphoric acid salts were undertaken. The thermal stability of bulk and supported TPA and Cs-TPA was investigated using TGA/DTA and FTIR techniques and the results are shown in FIG. 6 and FIG. 7 respectively. At about 600° C. (FIG. 6), bulk TPA seemed to undergo an exothermic decomposition (M. Misono, Catal. Rev.-Sci. Eng. 29 (1987) 269)

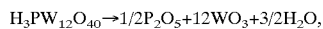

resulting in a weight loss of <2% above 300° C. while the bulk $Cs_{2.5}$-TPA did not show DTA evidence for decomposition nor any significant weight change in this temperature range. (Initial weight loss of ~11% (below 300° C.) for the bulk TPA was probably due to dehydration of the sample.) Unfortunately, TGA/DTA techniques were not suitable to accurately analyze the supported materials. Therefore, FT-IR was used to examine the stability of bulk and supported materials after a thermal treatment at 600° C. (FIG. 7). In agreement with the TGA/DTA results just described, the infrared spectrum of bulk $Cs_{2.5}$-TPA (FIG. 7, line (b)) shows the characteristic bands of the Keggin structure while that of bulk TPA (FIG. 7, line (a)) clearly indicates that decomposition occurred above 600° C. as evidenced by the disappearance and shift of characteristic IR bands. After annealing to 600° C. for 10 minutes, the supported Cs-TPA (FIG. 7, lines (c,d)) show the characteristic IR bands of the Keggin structure thus demonstrating there enhanced thermal stability relative to to bulk TPA materials. It is noteworthy that the thermal stability of the supported TPA is enhanced even with a single Cs substitution.

The leach resistance of both bulk and supported Cs-TPA materials with varying Cs content was also tested. The supported materials showed enhanced resistance to leaching with increasing Cs stoichiometry. Considering the fact that one of our purposes in using Cs was to anchor the TPA species to the silica support material, it is noteworthy that a small amount of Cs readily enhances its stability in aqueous solution. Thus, the results have shown that both the resistance against leaching by polar solvents and the thermal stability of supported Cs tungstophosphoric acid salts were significantly improved even at low Cs stoichiometry.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of depositing a metal heteropoly acid salt that is insoluble in a polar solvent onto a non-metallic support having a plurality of pores, comprising the steps of:

(a) obtaining a first solution containing a first precursor of a metal salt cation;

(b) obtaining a second solution containing a second precursor of a heteropoly acid anion in a solvent having a limited potential for dissolution of said first precursor;

(c) impregnating the non-metallic support with the first precursor forming a first precursor deposit within the plurality of pores, forming a first precursor impregnated support;

(d) heating said first precursor impregnated support forming a bonded first precursor impregnated support;

(e) impregnating the bonded first precursor impregnated support with the second precursor that reacts with the precursor deposit and forms the metal heteropoly acid salt a portion of which is dispersed upon the non-metallic support.

2. The method as recited in claim 1, wherein the metal of said metal salt cation is a Group 1A metal or silver.

3. The method as recited in claim 2, wherein the Group 1A metal is selected from the group consisting of Fr, Cs, Rb, K and combinations thereof.

4. The method as recited in claim 2, wherein said first solution has a solvent selected from the group consisting of water, methanol, acetone, and combinations thereof.

5. The method as recited in claim 1, wherein said second solution has a solvent that is an organic solvent.

6. The method as recited in claim 5, wherein said organic solvent is selected from the group consisting of ethanol, propanol, butanol, and combinations thereof.

7. The method as recited in claim 6, wherein said butanol is 1-butanol.

8. The method as recited in claim 1, wherein said heteropoly acid anion is selected from the group consisting of 12-tungstophosphoric acid, 12-molybdophosphoric acid, and combinations thereof.

* * * * *